US012743999B2

(12) United States Patent
Huang et al.

(10) Patent No.: US 12,743,999 B2

(45) Date of Patent: Sep. 22, 2026

(54) IMAGE DISPLAY LUMINANCE COMPENSATION METHOD, COMPUTER DEVICE, AND STORAGE MEDIUM

(71) Applicant: Glenfly Tech Co., Ltd., Shanghai (CN)

(72) Inventors: Long Huang, Shanghai (CN); Jiajun Li, Shanghai (CN); Kun Yang, Shanghai (CN); Jianhong Pan, Shanghai (CN); Chaohai Chang, Shanghai (CN); Lei Huang, Shanghai (CN); Xiaoguang Wang, Shanghai (CN); Wei Zhang, Shanghai (CN)

(73) Assignee: GLENFLY TECH CO., LTD., Shanghai (CN)

( * ) Notice: Subject to any disclaimer, the term of this patent is extended or adjusted under 35 U.S.C. 154(b) by 0 days.

(21) Appl. No.: 19/071,338

(22) Filed: Mar. 5, 2025

(65) Prior Publication Data

US 2026/0073859 A1 Mar. 12, 2026

(30) Foreign Application Priority Data

Sep. 10, 2024 (CN) ........................ 202411267109.1

(51) Int. Cl.
*G09G 3/3225* (2016.01)
*G09G 3/20* (2006.01)

(52) U.S. Cl.
CPC ......... *G09G 3/3225* (2013.01); *G09G 3/2007* (2013.01); *G09G 2320/0233* (2013.01); *G09G 2320/0626* (2013.01)

(58) Field of Classification Search
CPC ............... G09G 3/3225; G09G 3/2007; G09G 2320/0233; G09G 2320/0626; G09G 3/3208; G09G 2320/0271
USPC .................................................... 345/690, 76
See application file for complete search history.

(56) References Cited

U.S. PATENT DOCUMENTS

| | | | | |
|---|---|---|---|---|
| 9,390,645 B2 * | 7/2016 | Choi | ........................ | G09G 3/20 |
| 2007/0153098 A1 * | 7/2007 | Kao | .................. | H04N 21/4318 348/E5.074 |
| 2022/0223095 A1 * | 7/2022 | Zhang | ................. | G09G 3/3614 |

FOREIGN PATENT DOCUMENTS

| | | | | |
|---|---|---|---|---|
| CN | 116682351 A * | 9/2023 | ............... | G09G 3/20 |

OTHER PUBLICATIONS

English Translation for CN-116682351-A, pp. 1-21 (Year: 2026).*

* cited by examiner

*Primary Examiner* — Jimmy H Nguyen

(74) *Attorney, Agent, or Firm* — Nixon Peabody LLP

(57) ABSTRACT

An image display luminance compensation method includes: obtaining luminance data of a captured grayscale image; determining a target dimming interval in which a display grayscale of the grayscale image is located from a plurality of dimming intervals of a display screen, and determining an index value of the display grayscale in the target dimming interval; determining whether a luminance compensation is performed on the grayscale image according to the index value; obtaining set compensation data of a plurality of grayscale binding points when it is determined that the luminance compensation is performed on the grayscale image; and performing the luminance compensation on the luminance data of the grayscale image according to the set compensation data of the plurality of grayscale binding points.

20 Claims, 5 Drawing Sheets

IMAGE DISPLAY LUMINANCE COMPENSATION METHOD, COMPUTER DEVICE, AND STORAGE MEDIUM

CROSS-REFERENCE TO RELATED APPLICATIONS

The present application claims priority to Chinese patent application No. 2024112671091, filed on Sep. 10, 2024, the entire content of which is incorporated herein by reference.

TECHNICAL FIELD

The present disclosure relates to the field of image display technologies, and in particular, to an image display luminance compensation method, a computer device, and a storage medium.

BACKGROUND

Active-matrix organic light-emitting diode (AMOLED) screens are characterized by wide color gamut, wide viewing angle, and independent light emission, and are widely used in the field of image display. In order to eliminate the uneven display luminance of the AMOLED screen caused by the manufacturing process, an image display luminance compensation algorithm is generally used to compensate the display luminance of the AMOLED screen.

In the related art, the image display luminance compensation algorithm is mainly aimed at compensating a display brightness value (DBV) in a normal mode. The compensation of the low grayscale image display luminance in an ultra-low DBV mode is more complicated, and an effect of using the existing image display luminance compensation algorithm to perform luminance compensation on the low grayscale in the ultra-low DBV mode is relatively poor.

SUMMARY

In a first aspect, the present disclosure provides an image display luminance compensation method, including:

- obtaining luminance data of a captured grayscale image;
- determining a target dimming interval in which a display grayscale of the grayscale image is located from a plurality of dimming intervals of a display screen, and determining an index value of the display grayscale in the target dimming interval;
- determining whether a luminance compensation is performed on the grayscale image according to the index value;
- obtaining set compensation data of a plurality of grayscale binding points when it is determined that the luminance compensation is performed on the grayscale image; and
- performing the luminance compensation on the luminance data of the grayscale image according to the set compensation data of the plurality of grayscale binding points.

In an embodiment, determining whether the luminance compensation is performed on the grayscale image according to the index value includes:

- obtaining a luminance compensation protection threshold of the target dimming interval;
- determining, when the index value is greater than or equal to the luminance compensation protection threshold, that the luminance compensation is performed on the grayscale image; and
- determining, when the index value is less than the luminance compensation protection threshold, that the luminance compensation is not performed on the grayscale image.

In an embodiment, the method further includes:

- determining whether the display grayscale is located in a target grayscale range in a set grayscale interval; and
- performing, if it is determined that the display grayscale is located in the target grayscale range in the set grayscale interval, an interval compression processing on the display grayscale according to a maximum interval value and a minimum interval value of the grayscale interval to obtain an adjusted grayscale;
- the target grayscale range including a first grayscale range and a second grayscale range, the first grayscale range being a grayscale range less than a first grayscale value, the second grayscale range being a grayscale range greater than a second grayscale value, and the first grayscale value being less than the second grayscale value.

In an embodiment, performing the luminance compensation on the luminance data of the grayscale image according to the set compensation data of the plurality of grayscale binding points includes:

- comparing the display grayscale with a grayscale corresponding to a maximum binding point and a grayscale corresponding to a minimum binding point among the plurality of grayscale binding points, respectively, to obtain a comparison result;
- determining target compensation data of the display grayscale according to the comparison result and the set compensation data of the plurality of grayscale binding points; and
- performing the luminance compensation on the luminance data of the grayscale image by using the target compensation data.

In an embodiment, determining the target compensation data of the display grayscale according to the comparison result and the set compensation data of the plurality of grayscale binding points includes:

- determining, when the comparison result indicates that the display grayscale is greater than the grayscale corresponding to the minimum binding point and less than the grayscale corresponding to the maximum binding point, the target compensation data of the display grayscale by performing an interpolation processing on the set compensation data of the plurality of grayscale binding points.

In an embodiment, determining the target compensation data of the display grayscale according to the comparison result and the set compensation data of the plurality of grayscale binding points includes:

- generating, when the comparison result indicates that the display grayscale is less than the grayscale corresponding to the minimum binding point, set compensation data corresponding to a grayscale of a first endpoint according to an endpoint adjustment coefficient and the set compensation data corresponding to the minimum binding point; and
- performing an interpolation processing on the set compensation data corresponding to the minimum binding point and the set compensation data corresponding to the grayscale of the first endpoint to obtain the target compensation data of the display grayscale.

In an embodiment, determining the target compensation data of the display grayscale according to the comparison result and the set compensation data of the plurality of grayscale binding points includes:

generating, when the comparison result indicates that the display grayscale is greater than the grayscale corresponding to the maximum binding point, set compensation data corresponding to a grayscale of a second endpoint according to an endpoint adjustment coefficient and the set compensation data corresponding to the maximum binding point; and performing an interpolation processing on the set compensation data corresponding to the maximum binding point and the set compensation data corresponding to the second endpoint to obtain the target compensation data of the display grayscale.

In an embodiment, determining the target compensation data of the display grayscale according to the comparison result and the set compensation data of the plurality of grayscale binding points includes:

determining, when the comparison result indicates that the display grayscale is equal to the grayscale corresponding to the minimum binding point, the set compensation data of the minimum binding point as the target compensation data; and determining, when the comparison result indicates that the display grayscale is equal to the grayscale corresponding to the maximum binding point, the set compensation data of the maximum binding point as the target compensation data.

In an embodiment, determining the index value of the display grayscale in the target dimming interval includes:

determining a grayscale binding point corresponding to the display grayscale in the target dimming interval; and determining an index value corresponding to the grayscale binding point as the index value of the display grayscale in the target dimming interval.

In an embodiment, obtaining the set compensation data of the plurality of grayscale binding points includes:

obtaining luminance data of a plurality of set grayscale images captured under a target shooting luminance;

determining set compensation data corresponding to a plurality of display grayscales according to the luminance data of the plurality of set grayscale images; and determining the plurality of grayscale binding points from the plurality of display grayscales, and obtaining the set compensation data of the plurality of grayscale binding points.

In an embodiment, determining the set compensation data corresponding to the plurality of display grayscales includes:

solving a preset grayscale-luminance relationship curve function according to the luminance data of the plurality of set grayscale images to determine relationship parameters in the grayscale-luminance relationship curve;

generating a grayscale difference function according to the relationship parameters in the grayscale luminance relationship curve; and inputting standard luminance data of the plurality of display grayscales and the luminance data of the plurality of set grayscale images into the grayscale difference function to solve and obtain the set compensation data corresponding to the plurality of display grayscales.

In a second aspect, the present disclosure provides an image display luminance compensation apparatus, including:

an obtaining module configured to obtain luminance data of a captured grayscale image;

a detection module configured to determine a target dimming interval in which a display grayscale of the grayscale image is located from a plurality of dimming intervals of a display screen, determine an index value of the display grayscale in the target dimming interval, and determine whether a luminance compensation is performed on the grayscale image according to the index value; and a compensation module configured to obtain set compensation data of a plurality of grayscale binding points when it is determined that the luminance compensation is performed on the grayscale image, and perform the luminance compensation on the luminance data of the grayscale image according to the set compensation data of the plurality of grayscale binding points.

In an embodiment, the detection module is further configured to obtain a luminance compensation protection threshold of the target dimming interval; determine, when the index value is greater than or equal to the luminance compensation protection threshold, that the luminance compensation is performed on the grayscale image; and determine, when the index value is less than the luminance compensation protection threshold, that the luminance compensation is not performed on the grayscale image.

In an embodiment, the compensation module is further configured to determine whether the display grayscale is located in a target grayscale range in a set grayscale interval; and perform, if it is determined that the display grayscale is located in the target grayscale range in the set grayscale interval, an interval compression processing on the display grayscale according to a maximum interval value and a minimum interval value of the grayscale interval to obtain an adjusted grayscale. The target grayscale range includes a first grayscale range and a second grayscale range. The first grayscale range is a grayscale range less than a first grayscale value, the second grayscale range is a grayscale range greater than a second grayscale value, and the first grayscale value is less than the second grayscale value.

In an embodiment, the compensation module is further configured to compare the display grayscale with a grayscale corresponding to a maximum binding point and a grayscale corresponding to a minimum binding point among the plurality of grayscale binding points, respectively, to obtain a comparison result; determine target compensation data of the display grayscale according to the comparison result and the set compensation data of the plurality of grayscale binding points; and perform the luminance compensation on the luminance data of the grayscale image by using the target compensation data.

In an embodiment, the compensation module is further configured to determine, when the comparison result indicates that the display grayscale is greater than the grayscale corresponding to the minimum binding point and less than the grayscale corresponding to the maximum binding point, the target compensation data of the display grayscale by performing an interpolation processing on the set compensation data of the plurality of grayscale binding points.

In an embodiment, the compensation module is further configured to generate, when the comparison result indicates that the display grayscale is less than the grayscale corresponding to the minimum binding point, set compensation data corresponding to a grayscale of a first endpoint according to an endpoint adjustment coefficient and the set compensation data corresponding to the minimum binding point; and perform an interpolation processing on the set compensation data corresponding to the minimum binding point and the set compensation data corresponding to the grayscale of the first endpoint to obtain the target compensation data of the display grayscale.

In an embodiment, the compensation module is further configured to generate, when the comparison result indicates that the display grayscale is greater than the grayscale corresponding to the maximum binding point, set compensation data corresponding to a grayscale of a second endpoint according to an endpoint adjustment coefficient and the set compensation data corresponding to the maximum binding point; and perform an interpolation processing on the set compensation data corresponding to the maximum binding point and the set compensation data corresponding to the second endpoint to obtain the target compensation data of the display grayscale.

In an embodiment, the compensation module is further configured to determine, when the comparison result indicates that the display grayscale is equal to the grayscale corresponding to the minimum binding point, the set compensation data of the minimum binding point as the target compensation data; and determine, when the comparison result indicates that the display grayscale is equal to the grayscale corresponding to the maximum binding point, the set compensation data of the maximum binding point as the target compensation data.

In a third aspect, the present disclosure further provides a computer device. The computer device includes a processor and a memory storing a computer program. The processor, when executing the computer program, implements the image display luminance compensation method of the first aspect as described above.

In a fourth aspect, the present disclosure further provides a non-transitory computer-readable storage medium having a computer program stored therein. When the computer program is executed by a processor, the image display luminance compensation method of the first aspect as described above is implemented.

In a fifth aspect, the present disclosure further provides a computer program product, including a computer program. When the computer program is executed by a processor, the image display luminance compensation method of the first aspect as described above is implemented.

One or more embodiments of the present disclosure will be described in detail below with reference to drawings. Other features, objects and advantages of the present disclosure will become more apparent from the description, drawings, and claims.

BRIEF DESCRIPTION OF THE DRAWINGS

In order to describe the technical solutions of the embodiments of the present disclosure or the related art more clearly, the accompanying drawings required for describing the embodiments of the present disclosure or for describing the related art will be briefly introduced as follows. Apparently, the accompanying drawings, in the following description, illustrate merely some embodiments of the present disclosure, for a person of ordinary skill in the art, other drawings can also be obtained according to these accompanying drawings without making any creative efforts.

DETAILED DESCRIPTION OF THE EMBODIMENTS

Figure 1:
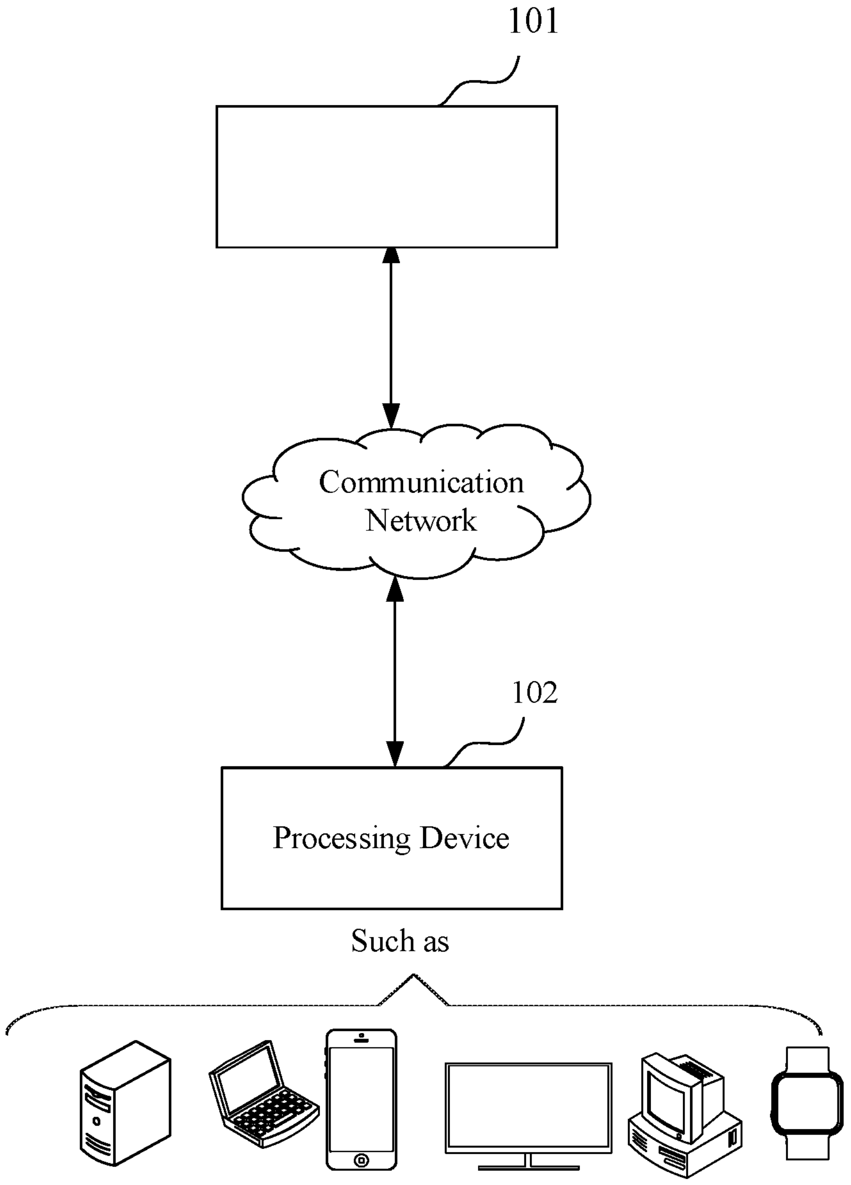
FIG. 1 is a diagram illustrating an application environment of an image display luminance compensation method according to embodiments of the present disclosure.

In order to make the objectives, technical solutions and advantages of the present disclosure more clearly understood, the present disclosure will be further described in detail with the accompanying drawings and embodiments. It should be understood that the specific embodiments described herein are only used to explain the present disclosure and not to limit the present disclosure.

The related art is described in advance as follows.

Active-matrix organic light-emitting diode (AMOLED) screens are characterized by wide color gamut, wide viewing angle, and independent light emission, and are widely used in the field of image display. However, in the manufacturing process of the AMOLED screens, due to the unevenness of amorphous silicon (A-SI), the unstable air pressure in an annealing chamber during the electron beam evaporation (ELA) stage, the interference between parallel and scanning directions caused by an optical system, the formation of CVD films, platform vibration and other factors, a large number of uneven display luminance (Mura) defects may be introduced into the AMOLED screen.

In order to eliminate the uneven display luminance of the AMOLED screen caused by the manufacturing process, an image display luminance compensation algorithm is generally used to compensate the display luminance of the AMOLED screen. The compensation for Mura depends on the display luminance. Generally, the conduction of pixels in the AMOLED screen is controlled by metal-oxide-semiconductor field-effect transistor (MOSFET) devices. The MOSFET device operates in a saturation region, and an on-current of the MOSFET is affected by a threshold voltage. As the display luminance decreases, the MOSFET devices corresponding to the pixels in the AMOLED screen enter a critical state between the saturation region and a linear region, so an unstable display effect may occur, resulting in serious color cast and split screen phenomena on the AMOLED screen.

In the related art, the image display luminance compensation algorithm is mainly aimed at compensating a display brightness value (DBV) in a normal mode. The compensation of the low grayscale image display luminance in an ultra-low DBV mode is more complicated, and an effect of using the current image display luminance compensation algorithm to perform luminance compensation on the low grayscale in the ultra-low DBV mode is relatively poor.

To address the above technical problems, the embodiments of the present disclosure provide an image display luminance compensation method and apparatus, a device, a storage medium and a program product. It is determined whether a luminance compensation is performed on a grayscale image according to an index value of a display grayscale in a target dimming interval, so as to achieve grayscale protection during the luminance compensation, and improve the luminance compensation effect in the ultra-low DBV mode.

The following describes an application environment of the image display luminance compensation method.

The image display luminance compensation method according to embodiments of the present disclosure may be applied to an application environment shown in FIG. 1. A photographing device 101 communicates with a processing device 102. A data storage system may store data that the processing device 102 needs to process. The data storage system may be integrated on the processing device 102, or may be placed on a cloud or other network servers.

When performing image display luminance compensation, the photographing device 101 may capture a grayscale image and obtain luminance data, and send the luminance data of the captured grayscale image to the processing device 102. Secondly, the processing device 102 determines a target dimming interval in which a display grayscale of the grayscale image is located from a plurality of dimming intervals of a display screen, and determines an index value of the display grayscale in the target dimming interval. Next, the processing device 102 determines whether a luminance compensation is performed on the grayscale image according to the index value. If it is determined that the luminance compensation is performed on the grayscale image, the processing device 102 obtains set compensation data of a plurality of grayscale binding points. Finally, the processing device 102 performs the luminance compensation on the luminance data of the grayscale image according to the set compensation data of the plurality of grayscale binding points.

The photographing device 101 may be a camera, a video camera, or the like. The processing device 102 may be a terminal or a server. The terminal may be, but is not limited to, various personal computers, laptops, smart phones, tablet computers, IoT (Internet of Things) devices, or portable wearable devices. The IoT device may be a smart speaker, a smart TV, a smart air conditioner, a smart car device, a projection device, or the like. The portable wearable device may be a smart watch, a smart bracelet, a head-mounted device, or the like. The head-mounted device may be a virtual reality (VR) device, an augmented reality (AR) device, a smart glass, or the like. The server may be an independent physical server, a server cluster or distributed system consisting of a plurality of physical servers, or a cloud server that provides a cloud computing service.

Figure 2:
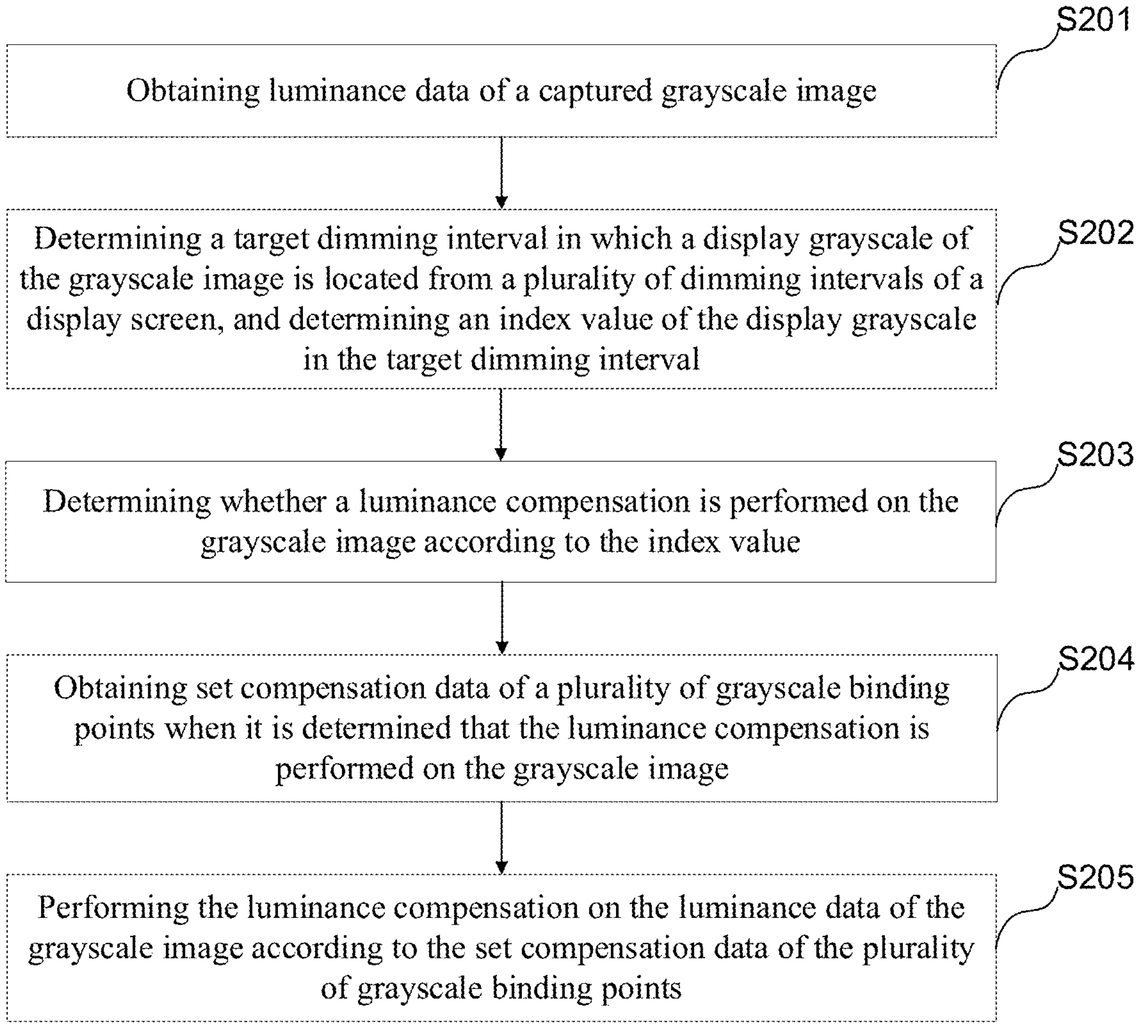
FIG. 2 is a schematic flowchart of an image display luminance compensation method according to embodiments of the present disclosure.

In an exemplary embodiment, as shown in FIG. 2, an image display luminance compensation method is provided. Taking the method applied to the processing device in FIG. 1 as an example for illustration, the method includes the following steps S201 to S205.

In the step S201, luminance data of a captured grayscale image is obtained.

In the present disclosure, the photographing device can capture grayscale images at different display grayscales, obtain the luminance data of the captured grayscale images, and send the luminance data of the captured grayscale images to the processing device.

The luminance data of the grayscale image includes luminance data of a plurality of pixels in the grayscale image.

In some embodiments, different grayscale images correspond to different display grayscales. Exemplarily, the plurality of grayscale images may correspond to a plurality of display grayscales such as 16, 32, 96, 160, 192, and 224, respectively. Since each grayscale is divided into three color channels of R, G, and B, when photographing the grayscale image of each display grayscale, the luminance data corresponding to the three color channels of R/G/B may be obtained respectively.

In the step S202, a target dimming interval in which a display grayscale of the grayscale image is located is determined from a plurality of dimming intervals of a display screen, and an index value of the display grayscale in the target dimming interval is determined.

In this step, after obtaining the luminance data of the captured grayscale image, the processing device can determine the target dimming interval in which the display grayscale of the grayscale image is located is determined from the plurality of dimming intervals of the display screen, and determine the index value of the display grayscale in the target dimming interval.

In some embodiments, a DBV interval may be divided into a plurality of dimming intervals, and each dimming interval corresponds to a grayscale-luminance relationship curve. The processing device can determine the dimming interval in which the display grayscale is located as the target dimming interval.

For example, the DBV interval may be divided into six dimming intervals: (0, 50), (50, 378), (379, 798), (799, 1468), (1469, 1898), and (1899, 2048). If the display grayscale is 60, it is within the dimming interval (50, 378), and the dimming interval (50, 378) is determined as the target dimming interval.

It should be understood that the embodiments of the present disclosure do not limit how to determine the index value of the display grayscale in the target dimming interval. In some embodiments, the same number of binding points may be set in each dimming interval, and the display grayscale in the interval corresponds to one of the binding points. The processing device can first determine the binding point corresponding to the display grayscale in the target dimming interval, and then determine the index value corresponding to the binding point as the index value of the display grayscale in the target dimming interval.

Exemplary, the processing device can set 28 binding points for each dimming interval, and the binding points of each dimming interval are different. Taking the dimming interval (50, 378) as an example, there are 28 binding points corresponding to the grayscale display. The index values corresponding to the 28 binding points are denoted as: Gamma_band={0x0, 0x30, 0x70, 0xb1, 0xf1, 0xa0, 0x110, 0x131, 0x171, 0x1b2, 0x1f2, 0x232, 0x272, 0x2f3, 0x373, 0x3f4, 0x4f5, 0x5f6, 0x6f7, 0x7f7, 0x8f8, 0x9f9, 0xafa, 0xbfb, 0xcfc, 0xdfd, 0xefe, 0xfff}.

In the step S203, it is determined whether a luminance compensation is performed on the grayscale image according to the index value.

In this step, after determining the index value of the display grayscale in the target dimming interval, the processing device can determine whether the luminance compensation is performed on the grayscale image according to the index value.

In some embodiments, the processing device may obtain a luminance compensation protection threshold of the target dimming interval. If the index value is greater than or equal to the luminance compensation protection threshold, it is determined that the luminance compensation is performed on the grayscale image. If the index value is less than the luminance compensation protection threshold, it is determined that the luminance compensation is not performed on the grayscale image.

It should be understood that the embodiments of the present disclosure do not limit the setting of the luminance compensation protection threshold. In some embodiments, the luminance compensation protection thresholds set for different dimming intervals are different. Exemplarily, Table 1 is a schematic table of luminance compensation protection thresholds provided in the embodiments of the present disclosure. As shown in Table 1, the luminance compensation protection threshold corresponding to the dimming interval (0, 50) is 0x10, the luminance compensation protection threshold corresponding to the dimming interval (50, 378) is 0x20, the luminance compensation protection threshold corresponding to the dimming interval (379, 798) is 0x30, the luminance compensation protection threshold corresponding to the dimming interval (799, 1468) is 0x50, the luminance compensation protection threshold corresponding to the dimming interval (1469, 1898) is 0x70, and the luminance compensation protection threshold corresponding to the dimming interval (1899, 2048) is 0xa0.

TABLE 1

| DBV Interval | Luminance Interval | Ath |
|---|---|---|
| (0, 50) | (L1 = 0 nit, L2 = 20 nit) | 0 × 10 |
| (50, 378) | (L1 = 20 nit, L2 = 150 nit) | 0 × 20 |
| (379, 798) | (L2 = 150 nit, L3 = 310 nit) | 0 × 30 |
| (799, 1468) | (L3 = 310 nit, L4 = 570 nit) | 0 × 50 |
| (1469, 1898) | (L4 = 570 nit, L5 = 730 nit) | 0 × 70 |
| (1899, 2048) | (L5 = 730 nit, L6 = 800 nit) | 0 × a0 |

Exemplarily, if the dimming interval (50, 378) is the target dimming interval, the luminance compensation protection threshold is 0x20. Correspondingly, when the index value of the display grayscale in the target dimming interval is less than 0x20, it is determined that the luminance compensation is not performed on the grayscale image. When the index value of the display grayscale in the target dimming interval is greater than or equal to 0x20, it is determined that the luminance compensation is performed on the grayscale image.

In the step S204, when it is determined that the luminance compensation is performed on the grayscale image, set compensation data of a plurality of grayscale binding points are obtained.

The above set compensation data of the plurality of grayscale binding points may be pre-generated compensation data stored in a database corresponding to the processing device.

The following describes how to generate the set compensation data of the plurality of grayscale binding points.

In some embodiments, the processing device can obtain luminance data of a plurality of set grayscale images captured under a target shooting luminance, and then determine set compensation data of respective pixels corresponding to different display grayscales according to the luminance data of the plurality of set grayscale images. Then, the plurality of grayscale binding points are determined from the plurality of display grayscales, and the set compensation data of the plurality of grayscale binding points are saved.

The luminance data of the set grayscale image includes the luminance data of a plurality of pixels in the set grayscale image.

In some embodiments, the processing device can first solve a preset grayscale-luminance relationship curve function according to the luminance data of the plurality of pixels in the plurality of set grayscale images to determine relationship parameters in the grayscale-luminance relationship curve. Secondly, the processing device can generate a grayscale difference function according to the relationship parameters in the grayscale luminance relationship curve. Thirdly, the processing device can obtain standard luminance data of different display grayscales. Finally, the processing device can input the standard luminance data of different display grayscales and the luminance data of the plurality of pixels in the set grayscale image corresponding to different display grayscales into the grayscale difference function to solve and obtain the set compensation data of the pixels corresponding to different display grayscales.

The standard luminance data is the luminance data of the central region of the corresponding set grayscale image. Exemplarily, the luminance data of the central region may be an average value of the luminance data of 40×40 pixels in the center.

Exemplarily, formula (1) is a set of equations corresponding to the grayscale-luminance relationship curve function. By inputting the display grayscale and the corresponding luminance data of each pixel of the R, G, and B color channels into the formula (1), the relationship parameters gamma1 and b1 in the grayscale-luminance relationship curve may be obtained.

$$\begin{cases} lg(lum1[i]) = gamma1 * lg(gray1[i]) + b1 \\ lg(\text{lumi\_mid}[i]) = gamma * lg(\text{gray}[i]) + b \end{cases} \quad (1)$$

where gray1[i] is the value of the $i^{th}$ display grayscale, lum1[i] is the luminance data corresponding to the pixel of the $i^{th}$ display grayscale, and i∈[16, 32, 64, 128, 192, 224]; the luminance lumi_mid[i] corresponding to the central region of the screen is the luminance data of the central region of the set grayscale image.

Exemplarily, the processing device can also solve other relationship parameters gamma and b in the grayscale-luminance relationship curve by inputting the display grayscale of each pixel of the R, G, and B color channels and the corresponding luminance data of the central region into the formula (1).

Exemplarily, after solving and obtaining the relationship parameters in the grayscale-luminance relationship curve, the processing device can construct the grayscale difference function based on the relationship parameters gamma1 and b1, and the grayscale difference function may be denoted as the following formula (2):

$$\nabla gray = \sqrt[gamma1]{\frac{\text{lum\_mid}}{10^{b1}}} - gray[i] \quad (2)$$

where ∇gray is the grayscale compensation value, gamma1 and b1 are the relationship parameters in the grayscale luminance relationship curve, gray1[i] is the value of the $i^{th}$ display grayscale, and i∈[16, 32, 64, 128, 192, 224].

Exemplarily, after generating the grayscale difference function, the processing device can input the standard luminance data of different display grayscales and the luminance data of the plurality of pixels in the set grayscale images corresponding to different display grayscales into the grayscale difference function, so as to solve the set grayscale compensation data of the pixels corresponding to the different display grayscales.

In some embodiments, when solving the set grayscale compensation data of the pixels corresponding to different display grayscales, the solution may be performed with the color channel as the dimension.

Exemplarily, taking the R channel as an example, the standard luminance data of different display grayscales and the luminance data of the plurality of pixels of the R channel corresponding to different display grayscales may be input into the grayscale difference function to obtain the set compensation data ∇gray16_R of display grayscale 16, the set compensation data ∇gray32_R of display grayscale 32, the set compensation data ∇gray96_R of display grayscale 96, the set compensation data ∇gray128_R of display grayscale 128, the set compensation data ∇gray192_R of display grayscale 192, and the set compensation data ∇gray224_R of display grayscale 224.

Exemplarily, taking the G channel as an example, the standard luminance data of different display grayscales and the luminance data of the plurality pixels of the G channel corresponding to different display grayscales may be input into the grayscale difference function to obtain the set compensation data ∇gray16_G of display grayscale 16, the set compensation data ∇gray32_G of display grayscale 32, the set compensation data ∇gray96_G of display grayscale 96, the set compensation data ∇gray128_G of display grayscale 128, the set compensation data ∇gray192_G of display grayscale 192, and the set compensation data ∇gray224_G of display grayscale 224.

In some embodiments, after determining the set compensation data of the pixels corresponding to different display grayscales, the processing device can determine the grayscale binding points from the plurality of display grayscales, and store the set compensation data of the grayscale binding points.

The grayscale binding point may be the display grayscale corresponding to the set compensation data to be stored.

It should be understood that the embodiments of the present disclosure do not limit how to determine the grayscale binding points from the plurality of display grayscales. In some embodiments, the processing device can receive instruction information input by a user and select one or more grayscale binding points from the plurality of display grayscales.

Exemplarily, for original grayscale compensation data of six display grayscales of 16, 32, 64, 128, 192, and 224, three display grayscales may be selected as the grayscale binding points, for example, the display grayscales 16, 64, and 192 are selected as the grayscale binding points.

In some embodiments, when it is determined that the luminance compensation is performed on the grayscale image, the processing device can also determine whether the display grayscale is located in a target grayscale range in a set grayscale interval.

When it is determined that the display grayscale is located in the target grayscale range in the set grayscale interval, an interval compression processing is performed on the display grayscale according to a maximum interval value and a minimum interval value of the grayscale interval to obtain an adjusted grayscale. When it is determined that the display grayscale is not located in the target grayscale range in the set grayscale interval, the interval compression processing is not performed on the display grayscale.

The target grayscale range includes a first grayscale range and a second grayscale range. The first grayscale range is a grayscale range less than a first grayscale value, and the second grayscale range is a grayscale range greater than a second grayscale value. The first grayscale value is less than the second grayscale value.

Exemplarily, if the 12-bit grayscale interval is (0, 4095), the first grayscale range corresponding to a lower grayscale is (0, 128), and the second grayscale range corresponding to a higher grayscale is (3792, 4095). If the display grayscale is located in the first grayscale range, the interval compression processing may be performed on the display grayscale by using the following formula (3), formula (4) and formula (5) to obtain the adjusted grayscale.

$$\text{rmp\_data} = data12 * (\text{rmp\_max} + \text{rmp\_min}) \tag{3}$$

$$\text{rmp\_data} = (\text{rmp\_data} + 2048) >> 12 \tag{4}$$

$$data12 = \text{rmp\_data} + \text{rmp\_min} \tag{5}$$

where rmp_max is the maximum interval value, rmp_min is the minimum interval value, and data12 is the display grayscale or the adjusted grayscale.

Exemplarily, if the maximum interval value is 4096, the minimum interval value is 32, and the display grayscale is 100, then according to formula (3), a value of rmp_data is equal to 100*(4096+32), which is equal to 412800. Then, according to formula (4), a value of rmp_data is equal to (412800+2048)>>12, which is equal to 101. Further, according to formula (5), a value of data12 is equal to 101+32, which is equal to 133. In other words, the display grayscale is compressed from 100 to 133.

Exemplarily, if the display grayscale is located in the second grayscale range, the interval compression processing may be performed on the display grayscale by using the following formula (6), formula (7) and formula (8) to obtain the adjusted grayscale.

$$\text{rmp\_data} = data12 * (\text{rmp\_max} - \text{rmp\_min}) \tag{6}$$

$$\text{rmp\_data} = (\text{rmp\_data} + 2048) >> 12 \tag{7}$$

$$data12 = \text{rmp\_data} + \text{rmp\_min} \tag{8}$$

where rmp_max is the maximum interval value, rmp_min is the minimum interval value, and data12 is the display grayscale or the adjusted grayscale.

Exemplarily, if the maximum interval value is 3968, the minimum interval value is 32, and the display grayscale is 1024, then according to formula (6), a value of rmp_data is equal to 1024*(3968−32), which is equal to 4030464. Then, according to formula (7), a value of rmp_data is equal to (4030464+2048)>>12, which is equal to 984. Further, according to formula (8), a value of data12 is equal to 984+32, which is equal to 1016. In other words, the display grayscale is compressed from 1024 to 1016.

In the present disclosure, interval compression adjustment is performed on the grayscales at both ends of the target grayscale range to expand a compensation interval. In related art, when the image luminance compensation occurs in the high grayscale range and the low grayscale range, a value of the input grayscale plus the compensation value will be out of the original set interval, resulting in color deviation in the display after compensation. In the present disclosure, through the interval compression adjustment, the problem of insufficient compensation at both ends of the high and low grayscale ranges is eliminated, and the compression interval is introduced to adjust the original grayscale.

In the step S205, the luminance compensation is performed on the luminance data of the grayscale image according to the set compensation data of the plurality of grayscale binding points.

In this step, after obtaining the set compensation data of the plurality of grayscale binding points, the processing device can perform the luminance compensation on the luminance data of the grayscale image according to the set compensation data of the plurality of grayscale binding points.

In some embodiments, the processing device can compare the display grayscale with a grayscale corresponding to a maximum binding point and a grayscale corresponding to a minimum binding point among the plurality of grayscale binding points, respectively, to obtain a comparison result. Further, the processing device can determine target compensation data of the display grayscale according to the comparison result and the set compensation data of the plurality of grayscale binding points. Finally, the processing device can perform the luminance compensation on the luminance data of the grayscale image by using the target compensation data.

Exemplarily, if the plurality of grayscale binding points include 32, 96, and 160, the display grayscale may be compared with 32, 96, and 160, respectively.

In some embodiments, when the comparison result indicates that the display grayscale is equal to the grayscale corresponding to the minimum binding point, the set compensation data of the minimum binding point is determined as the target compensation data. When the comparison result indicates that the display grayscale is equal to the grayscale corresponding to the maximum binding point, the set compensation data of the maximum binding point is determined as the target compensation data.

Exemplarily, if the plurality of grayscale binding points include 32, 96, and 160, the display grayscale may be compared with 32, 96, and 160, respectively. If the display grayscale is equal to grayscale 32 corresponding to the minimum binding point, the set compensation data ∇gray32 of the minimum binding point can be determined as the target compensation data. If the display grayscale is equal to grayscale 160 corresponding to the maximum binding point, the set compensation data ∇gray160 of the maximum binding point can be determined as the target compensation data.

In some embodiments, when the comparison result indicates that the display grayscale is greater than the grayscale corresponding to the minimum binding point and less than the grayscale corresponding to the maximum binding point, the target compensation data of the display grayscale is determined by performing an interpolation processing on the set compensation data of the plurality of grayscale binding points.

Exemplarily, if the plurality of grayscale binding points include 32, 96, and 160, and the display grayscale is located between grayscale 32 and grayscale 160, compensation values may be interpolated between the display grayscale and the grayscales corresponding to the plurality of grayscale binding points to obtain the target compensation data.

In some embodiments, when the comparison result indicates that the display grayscale is less than the grayscale corresponding to the minimum binding point, the processing device generates set compensation data corresponding to a grayscale of a first endpoint according to an endpoint adjustment coefficient and the set compensation data corresponding to the minimum binding point. Further, the processing device performs an interpolation processing on the set compensation data corresponding to the minimum binding point and the set compensation data corresponding to the grayscale of the first endpoint to obtain the target compensation data of the display grayscale.

In some embodiments, when the comparison result indicates that the display grayscale is greater than the grayscale corresponding to the maximum binding point, the processing device generates set compensation data corresponding to a grayscale of a second endpoint according to an endpoint adjustment coefficient and the set compensation data corresponding to the maximum binding point. Further, the processing device performs an interpolation processing on the set compensation data corresponding to the maximum binding point and the set compensation data corresponding to the second endpoint to obtain the target compensation data of the display grayscale.

The minimum binding point is an adjacent binding point nearest to the first endpoint, and the maximum binding point is an adjacent binding point nearest to the second endpoint.

Exemplarily, if the plurality of grayscale binding points include 32, 96, and 160, when the display grayscale is less than the grayscale 32, the target compensation values between the grayscale 0 and the grayscale 32 cannot be directly obtained, and the target compensation data between the grayscale 160 and the grayscale 255 cannot be directly obtained either. In this case, for the 0~32 grayscale range and the 160~255 grayscale range, the endpoint adjustment coefficient (P coefficient, and Q coefficient) may be used to adjust the set compensation data corresponding to the two endpoints (the first endpoint and the second endpoint), and then the subsequent interpolation processing may be performed to obtain the target compensation data of the display grayscale.

Exemplarily, the set compensation data corresponding to the grayscale of the first endpoint and the set compensation data corresponding to the grayscale of the second endpoint may be determined by using the following formula (9):

$$\nabla gray_{i\_new} = (\nabla gray_{i\_old} * P) >> Q \tag{9}$$

where P and Q are the endpoint adjustment coefficients, which may be set according to an actual condition, $\nabla gray_{i\_new}$ is the set compensation data corresponding to the grayscale of the first endpoint or the set compensation data corresponding to the grayscale of the second endpoint, and $\nabla gray_{i\_old}$ is the set compensation data corresponding to the minimum binding point or the set compensation data corresponding to the maximum binding point.

Exemplarily, if the grayscale of the first endpoint is 0, the grayscale of the second endpoint is 255, the grayscale of the minimum binding point is 32, and the grayscale of the maximum binding point is 160, when P is 5 and Q is 3, the set compensation data $\nabla gray_0$ corresponding to the first endpoint is equal to $(\nabla gray_{32}*5)>>3$. When P is 10 and Q is 2, the set compensation data $\nabla gray_{255}$ corresponding to the second endpoint is equal to $(\nabla gray_{160}*10)>>2$.

Exemplarily, after determining the set compensation data corresponding to the first endpoint and the set compensation data corresponding to the second endpoint, the target compensation data of the display grayscale may be obtained by using an interpolation method. If the plurality of grayscale binding points include 32, 96, and 160, and the display grayscale data0 is less than the grayscale corresponding to the minimum binding point 32, the target compensation data ∇gray1 of the display grayscale data0 may be determined by using the following formula (10):

$$\nabla gray_1 = \nabla gray_{32} - \frac{\nabla gray_{32} - (\nabla gray_{32} * 5) >> 3}{32 - 0} * (32 - data0) \quad (10)$$

Exemplarily, if the plurality of grayscale binding points include 32, 96, and 160, and the grayscale datal is greater than the grayscale corresponding to the maximum binding point 160, the target compensation data $\nabla gray_2$ of the display grayscale datal may be determined by using the following formula (11):

$$\nabla gray_2 = \nabla gray_{160} - \frac{\nabla gray_{160} - (\nabla gray_{160} * 10) \gg 2}{166 - 255} * (160 - data1) \quad (11)$$

In the present disclosure, the set compensation values of the endpoints at both ends are adjusted by adjusting the adjustment coefficients, so as to provide a variety of configuration modes that can be selected by the terminal.

In the image display luminance compensation method provided in the embodiments of the present disclosure, the luminance data of the captured grayscale image is first obtained. Secondly, the target dimming interval in which the display grayscale of the grayscale image is located is determined from the plurality of dimming intervals of the display screen, and the index value of the display grayscale in the target dimming interval is determined. Thirdly, according to the index value, it is determined whether the luminance compensation is performed on the grayscale image. If it is determined that the luminance compensation is performed on the grayscale image, then the set compensation data of the plurality of grayscale binding points are obtained. Finally, the luminance compensation is performed on the luminance data of the grayscale image according to the set compensation data of the plurality of grayscale binding points. It is determined whether the luminance compensation is performed on the grayscale image according to the index value of the display grayscale in the target dimming interval, so as to achieve grayscale protection during the luminance compensation, and improve the luminance compensation effect in the ultra-low DBV mode.

Figure 3:
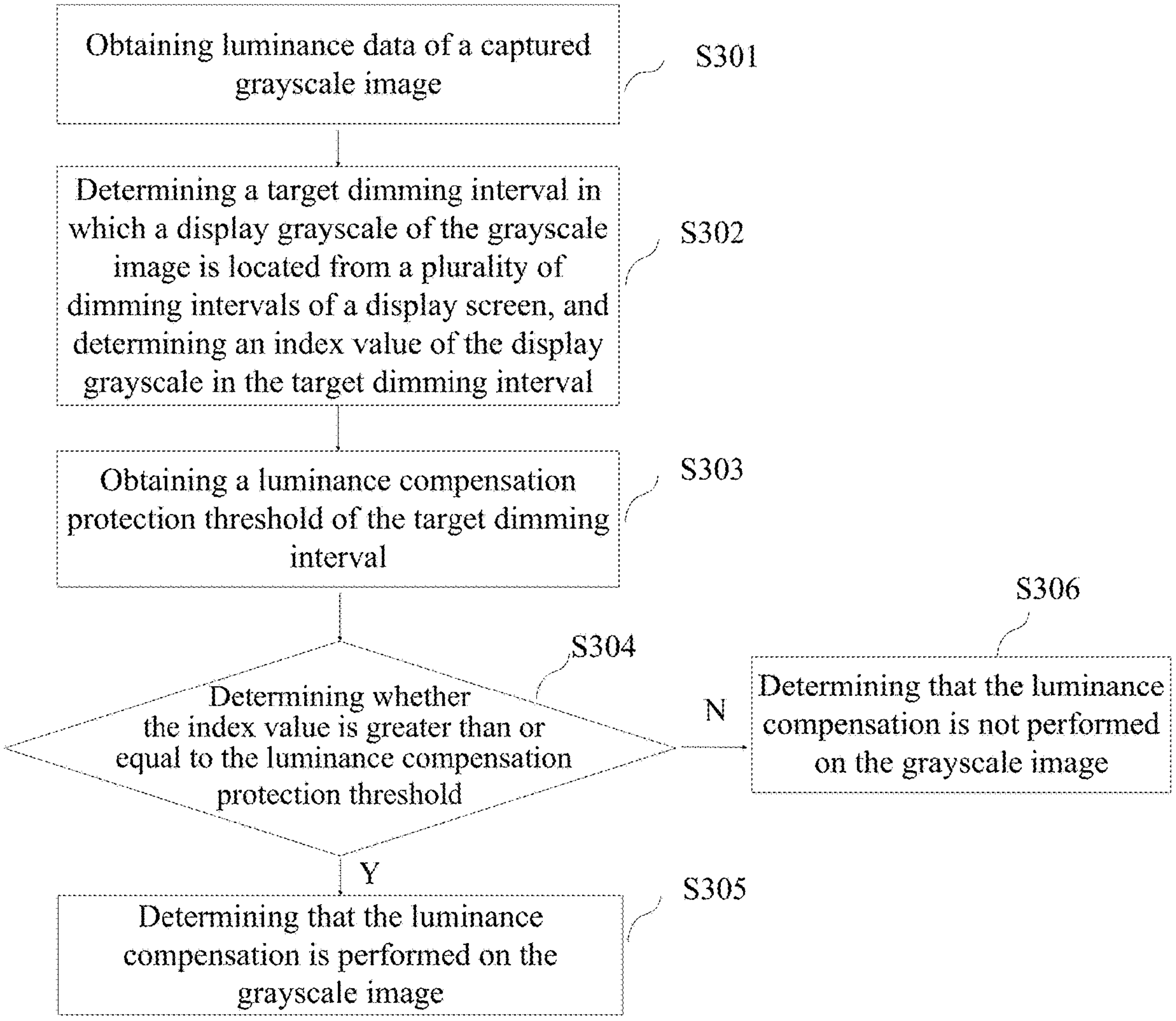
FIG. 3 is a schematic flowchart of another image display luminance compensation method according to embodiments of the present disclosure.

The following describes how to determine whether the luminance compensation is performed on the grayscale image. FIG. 3 is a schematic flowchart of another image display luminance compensation method according to embodiments of the present disclosure. As shown in FIG. 3, the image display luminance compensation method includes the following steps S301 to S306:

In the step S301, luminance data of a captured grayscale image is obtained.

In the step S302, a target dimming interval in which a display grayscale of the grayscale image is located is determined from a plurality of dimming intervals of a display screen, and an index value of the display grayscale in the target dimming interval is determined.

In the step S303, a luminance compensation protection threshold of the target dimming interval is obtained.

In the step S304, it is determined whether the index value is greater than or equal to the luminance compensation protection threshold.

If it is determined that the index value is greater than or equal to the luminance compensation protection threshold, the step S305 is performed, if not, the step S306 is performed.

In the step S305, it is determined that a luminance compensation is performed on the grayscale image.

In the step S306, it is determined that the luminance compensation is not performed on the grayscale image.

Figure 4:
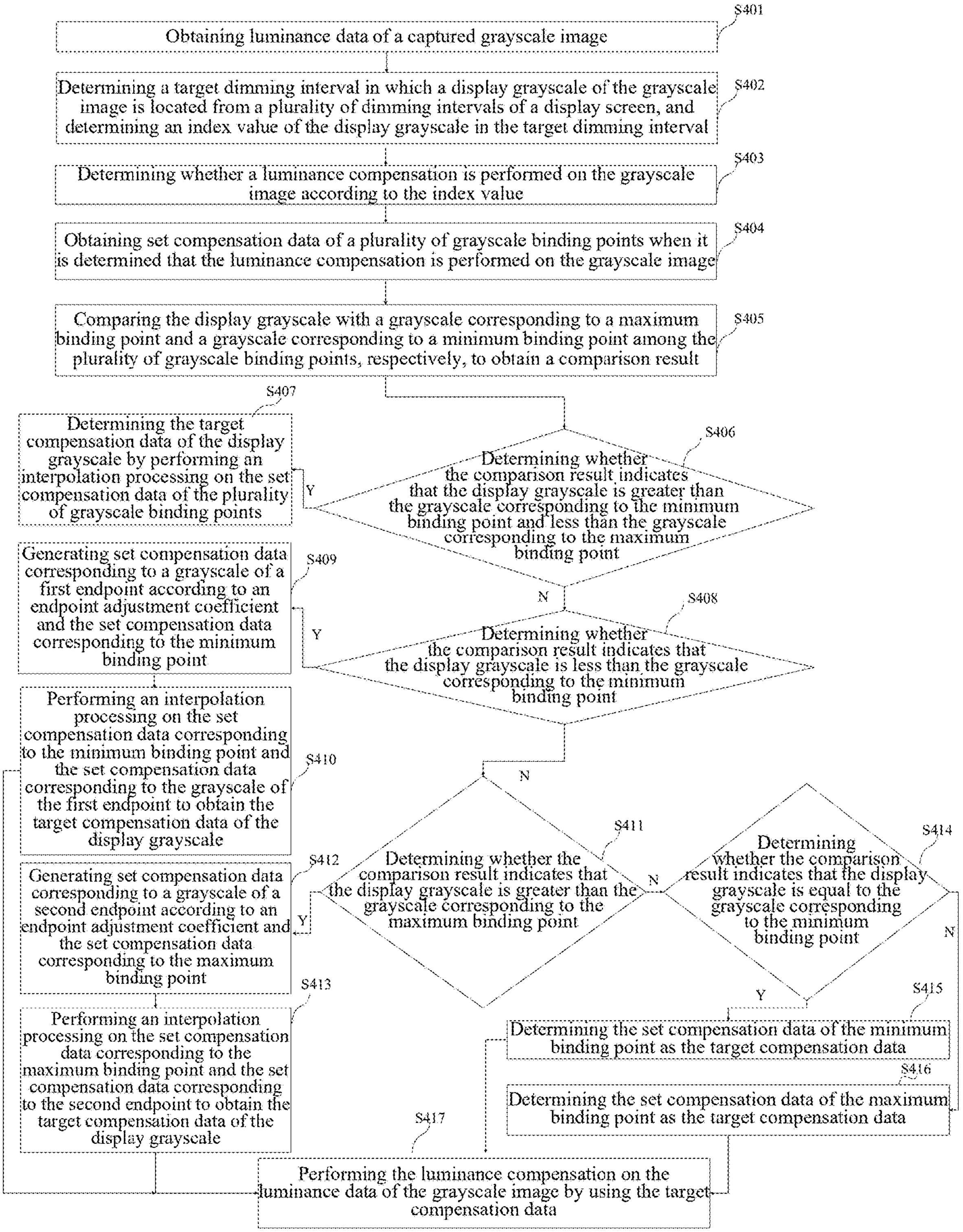
FIG. 4 is a schematic flowchart of another image display luminance compensation method according to embodiments of the present disclosure.

The following describes how the luminance compensation is performed on the luminance data of the grayscale image. FIG. 4 is a schematic flowchart of another image display luminance compensation method according to embodiments of the present disclosure. As shown in FIG. 4, the image display luminance compensation method includes the following steps: In the step S401, luminance data of a captured grayscale image is obtained.

In the step S402, a target dimming interval in which a display grayscale of the grayscale image is located is determined from a plurality of dimming intervals of a display screen, and an index value of the display grayscale in the target dimming interval is determined.

In the step S403, it is determined whether a luminance compensation is performed on the grayscale image according to the index value.

In the step S404, when it is determined that the luminance compensation is performed on the grayscale image, then set compensation data of a plurality of grayscale binding points are obtained.

In the step S405, the display grayscale is compared with a grayscale corresponding to a maximum binding point and a grayscale corresponding to a minimum binding point among the plurality of grayscale binding points, respectively, to obtain a comparison result.

In the step S406, it is determined whether the comparison result indicates that the display grayscale is greater than the grayscale corresponding to the minimum binding point and less than the grayscale corresponding to the maximum binding point.

If it is determined that the comparison result indicates that the display grayscale is greater than the grayscale corresponding to the minimum binding point and less than the grayscale corresponding to the maximum binding point, the step S407 is performed. If not, the step S408 is performed.

In the step S407, an interpolation processing is performed on the set compensation data of the plurality of grayscale binding points to determine target compensation data of the display grayscale.

After the step S407 is performed, the step S417 is performed.

In the step S408, it is determined whether the comparison result indicates that the display grayscale is less than the grayscale corresponding to the minimum binding point.

If it is determined that the comparison result indicates that the display grayscale is less than the grayscale corresponding to the minimum binding point, the step S409 is performed. If not, the step S411 is performed.

In the step S409, set compensation data corresponding to a grayscale of a first endpoint is generated according to an endpoint adjustment coefficient and the set compensation data corresponding to the minimum binding point.

In the step S410, the interpolation processing is performed on the set compensation data corresponding to the minimum binding point and the set compensation data corresponding to the grayscale of the first endpoint to obtain the target compensation data of the display grayscale.

After the step S410 is performed, the step S417 is performed.

In the step S411, it is determined whether the comparison result indicates that the display grayscale is greater than the grayscale corresponding to the maximum binding point.

If it is determined that the comparison result indicates that the display grayscale is greater than the grayscale corresponding to the maximum binding point, the step S412 is performed. If not, the step S414 is performed.

In the step S412, set compensation data corresponding to a grayscale of a second endpoint is generated according to an endpoint adjustment coefficient and the set compensation data corresponding to the maximum binding point.

In the step S413, the interpolation processing is performed on the set compensation data corresponding to the maximum binding point and the set compensation data corresponding to the second endpoint to obtain the target compensation data of the display grayscale.

After the step S413 is performed, the step S417 is performed.

In the step S414, it is determined whether the comparison result indicates that the display grayscale is equal to the grayscale corresponding to the minimum binding point.

If it is determined that the comparison result indicates that the display grayscale is equal to the grayscale corresponding to the minimum binding point, the step S415 is performed. If not, the step S416 is performed.

In the step S415, the set compensation data of the minimum binding point is determined as the target compensation data.

After the step S415 is performed, the step S417 is performed.

In the step S416, the set compensation data of the maximum binding point is determined as the target compensation data.

In the step S417, the luminance compensation is performed on the luminance data of the grayscale image by using the target compensation data.

In the image display luminance compensation method provided in the embodiments of the present disclosure, the luminance data of the captured grayscale image is first obtained. Secondly, the target dimming interval in which the display grayscale of the gray scale image is located is determined from the plurality of dimming intervals of the display screen, and the index value of the display grayscale in the target dimming interval is determined. Thirdly, according to the index value, it is determined whether the luminance compensation is performed on the grayscale image. If it is determined that the luminance compensation is performed on the grayscale image, then the set compensation data of the plurality of grayscale binding points are obtained. Finally, the luminance compensation is performed on the luminance data of the grayscale image according to the set compensation data of the plurality of grayscale binding points. Since it is determined whether the luminance compensation is performed on the grayscale image according to the index value of the display grayscale in the target dimming interval, so as to achieve grayscale protection during the luminance compensation, and improve the luminance compensation effect in the ultra-low DBV mode.

It should be understood that although the individual steps in the flow diagrams involved in the embodiments as described above are shown sequentially as indicated by arrows, the steps are not necessarily performed sequentially in the order indicated by the arrows. Unless explicitly stated herein, the execution of these steps is not strictly limited in order and these steps can be performed in any other order. Moreover, at least some of the steps in the flow diagrams involved in the embodiments as described above may include a plurality of steps or a plurality of stages that are not necessarily performed at the same time, but may be performed at different times. The order in which these steps or stages are performed is not necessarily sequential, and these steps may be performed alternately or alternately with other steps or at least some of the steps or stages in other steps.

Based on the same inventive concept, embodiments of the present disclosure also provide an image display luminance compensation apparatus for implementing the image display luminance compensation method as described above. The solution to the problem provided by the apparatus is similar to the implementation of the method documented above, so the specific features in the one or more embodiments of the image display luminance compensation apparatus provided below may be understood with reference to the features of the image display luminance compensation method above and will not be repeated here.

Figure 5:
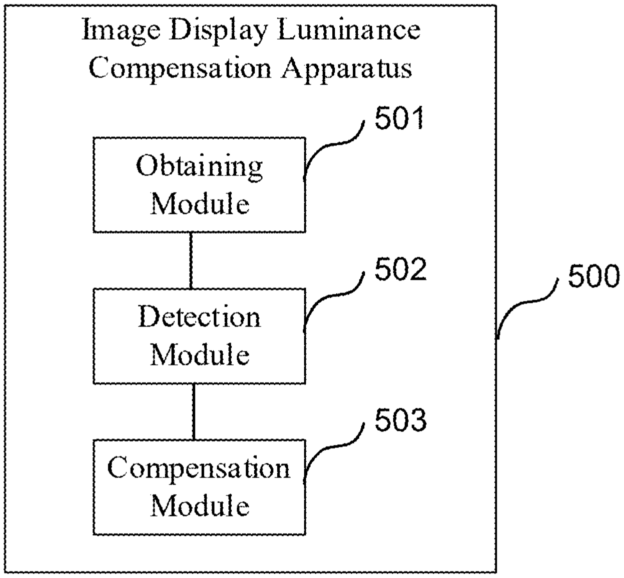
FIG. 5 is a block diagram illustrating a configuration of an image display luminance compensation apparatus according to embodiments of the present disclosure.

In an exemplary embodiment, as shown in FIG. 5, an image display luminance compensation apparatus 500 is provided, including an obtaining module 501, a detection module 502 and a compensation module 503.

The obtaining module 501 is configured to obtain luminance data of a captured grayscale image.

The detection module 502 is configured to determine a target dimming interval in which a display grayscale of the grayscale image is located from a plurality of dimming intervals of a display screen, determine an index value of the display grayscale in the target dimming interval, and determine whether a luminance compensation is performed on the grayscale image according to the index value.

The compensation module 503 is configured to obtain set compensation data of a plurality of grayscale binding points when it is determined that the luminance compensation is performed on the grayscale image, and perform the luminance compensation on the luminance data of the grayscale image according to the set compensation data of the plurality of grayscale binding points.

In an embodiment, the detection module 502 is further configured to obtain a luminance compensation protection threshold of the target dimming interval; determine, when the index value is greater than or equal to the luminance compensation protection threshold, that the luminance compensation is performed on the grayscale image; and determine, when the index value is less than the luminance compensation protection threshold, that the luminance compensation is not performed on the grayscale image.

In an embodiment, the compensation module 503 is further configured to determine whether the display grayscale is located in a target grayscale range in a set grayscale interval; and perform, if it is determined that the display grayscale is located in the target grayscale range in the set grayscale interval, an interval compression processing on the display grayscale according to a maximum interval value and a minimum interval value of the grayscale interval to obtain an adjusted grayscale.

The target grayscale range includes a first grayscale range and a second grayscale range. The first grayscale range is a grayscale range less than a first grayscale value, the second grayscale range is a grayscale range greater than a second grayscale value, and the first grayscale value is less than the second grayscale value.

In an embodiment, the compensation module 503 is further configured to compare the display grayscale with a grayscale corresponding to a maximum binding point and a grayscale corresponding to a minimum binding point among the plurality of grayscale binding points, respectively, to obtain a comparison result; determine target compensation data of the display grayscale according to the comparison result and the set compensation data of the plurality of grayscale binding points; and perform the luminance compensation on the luminance data of the grayscale image by using the target compensation data.

In an embodiment, the compensation module 503 is further configured to determine, when the comparison result indicates that the display grayscale is greater than the grayscale corresponding to the minimum binding point and less than the grayscale corresponding to the maximum binding point, the target compensation data of the display grayscale by performing an interpolation processing on the set compensation data of the plurality of grayscale binding points.

In an embodiment, the compensation module 503 is further configured to generate, when the comparison result indicates that the display grayscale is less than the grayscale corresponding to the minimum binding point, set compensation data corresponding to a grayscale of a first endpoint according to an endpoint adjustment coefficient and the set compensation data corresponding to the minimum binding point; and perform an interpolation processing on the set compensation data corresponding to the minimum binding point and the set compensation data corresponding to the grayscale of the first endpoint to obtain the target compensation data of the display grayscale.

In an embodiment, the compensation module 503 is further configured to generate, when the comparison result indicates that the display grayscale is greater than the grayscale corresponding to the maximum binding point, set compensation data corresponding to a grayscale of a second endpoint according to an endpoint adjustment coefficient and the set compensation data corresponding to the maximum binding point; and perform an interpolation processing on the set compensation data corresponding to the maximum binding point and the set compensation data corresponding to the second endpoint to obtain the target compensation data of the display grayscale.

In an embodiment, the compensation module 503 is further configured to determine, when the comparison result indicates that the display grayscale is equal to the grayscale corresponding to the minimum binding point, the set compensation data of the minimum binding point as the target compensation data; and determine, when the comparison result indicates that the display grayscale is equal to the grayscale corresponding to the maximum binding point, the set compensation data of the maximum binding point as the target compensation data.

The individual modules in the above image display luminance compensation apparatus can be implemented in whole or in part by software, hardware and combinations thereof. Each of the above modules may be embedded in hardware form or independent of a processor in a computer device, or may be stored in software form on a memory in the computer device so that the processor can be called to perform the operations corresponding to each of the above modules.

In an exemplary embodiment, a computer device is provided. The computer device may be a processing device. The processing device may be a server or a terminal. A diagram illustrating an internal configuration of the computer device may be shown in FIG. 6. The computer device includes a processor, a memory, an input/output (I/O) interface, and a communication interface. The processor, the memory and the input/output interface are connected via a system bus, and the communication interface is connected to the system bus via the input/output interface. The processor of the computer device is configured to provide computing and control capabilities. The memory of the computer device includes a non-transitory storage medium and an internal memory. The non-transitory storage medium stores an operating system, a computer program, and a database. The internal memory provides an environment for the operation of the operating systems and the computer programs in the non-transitory storage medium. The database of the computer device is configured to store data. The input/output interface of the computer device is configured to exchange information between the processor and external devices. The communication interface of the computer device is configured to communicate with external terminals via a network connection. When the computer program is executed by the processor, an image display luminance compensation method is implemented.

Figure 6:
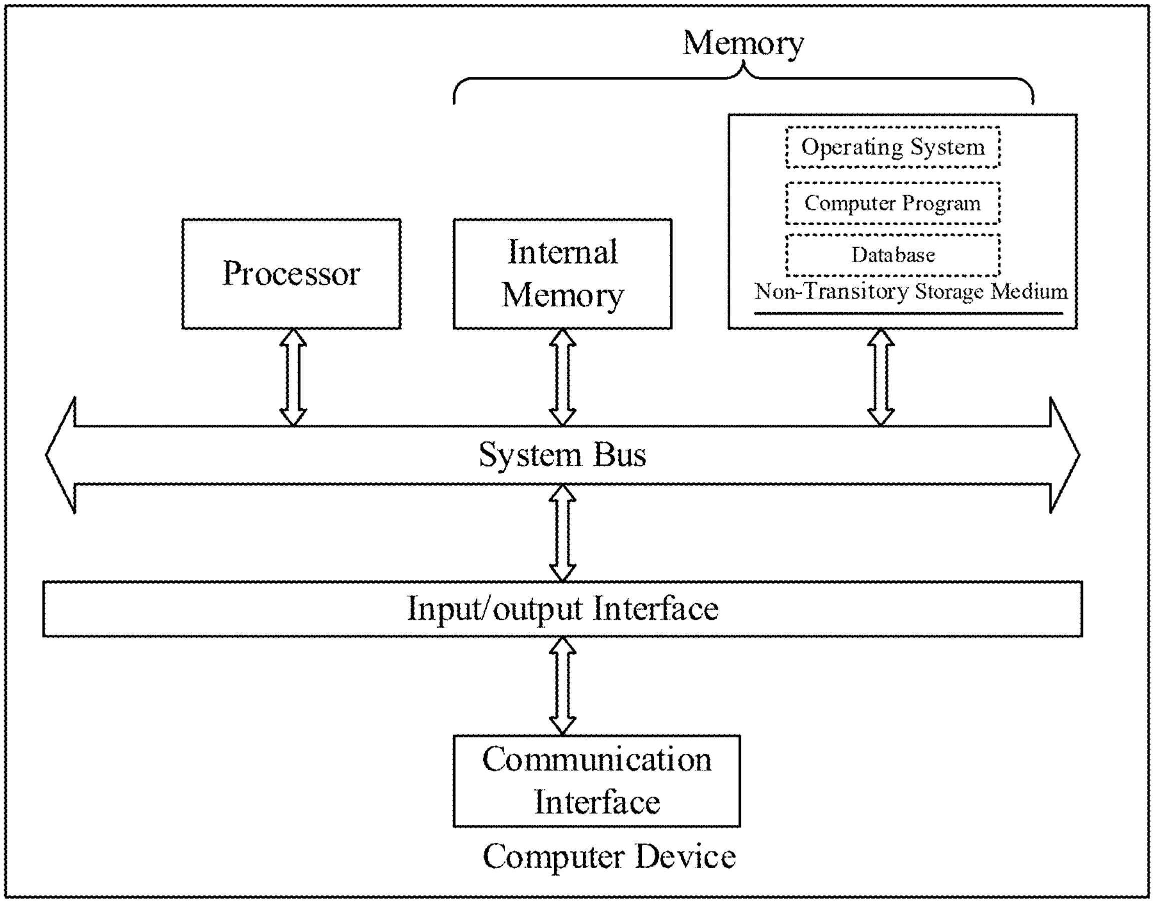
FIG. 6 is a diagram illustrating an internal configuration of a computer device according to embodiments of the present disclosure.

It should be understood by a person of ordinary skill in the art that the configuration illustrated in FIG. 6 is only a block diagram of part of the configuration related to the solution of the present disclosure, and does not constitute a limitation on the computer device to which the solution of the present disclosure is applied. A specific computer device may include more or less components than those shown in the figure, or may combine some components, or may have a different arrangement of components.

In an exemplary embodiment, a computer device is provided. The computer device includes a processor and a memory storing a computer program. The processor, when executing the computer program, implements the image display luminance compensation method as described above.

In an embodiment, a non-transitory computer-readable storage medium having a computer program stored therein is provided. When the computer program is executed by a processor, the image display luminance compensation method as described above is implemented.

In an embodiment, a computer program product is provided, including a computer program. When the computer program is executed by a processor, the image display luminance compensation method as described above is implemented.

A person of ordinary skill in the art may understand that implementation of all or part of the processes in the methods of the above embodiments may be completed by instructing the relevant hardware through a computer program. The computer program may be stored in a non-transitory computer-readable storage medium. When the computer program is executed, it may include the processes of the embodiments of the above methods. Any reference to memory, database or other medium used of the embodiments provided in the present disclosure may include at least one of a non-transitory or a transitory memory. The non-transitory memory may include a read-only memory (ROM), a magnetic tape, a floppy disk, a flash memory, an optical memory, a high-density embedded non-transitory memory, a resistive random-access memory (ReRAM), a magneto resistive random-access memory (MRAM), a ferroelectric random-access memory (FRAM), a phase change memory (PCM), or a graphene memory, etc. The transitory memory may include a random-access memory (RAM) or an external cache memory, etc. As an illustration rather than a limitation, the random-access memory may be in various forms, such as a static random-access memory (SRAM) or a dynamic random-access memory (DRAM), etc. The databases involved in the embodiments provided by the present disclosure may include at least one of a relational database and a non-relational database. The non-relational database may include, but is not limited to, a blockchain-based distributed database, etc. The processor involved in the embodiments provided by the present disclosure may be, but is not limited to, a general purpose processor, a central processor, a graphics processor, a digital signal processor, a programmable logic device, a data processing logic device based on quantum computation, an artificial intelligence (AI) processor, and the like.

The technical features in the above embodiments may be combined arbitrarily. For concise description, not all possible combinations of the technical features in the above embodiments are described. However, provided that they do not conflict with each other, all combinations of the technical features are to be considered to be within the scope described in this specification.

The above-mentioned embodiments only describe several implementations of the present disclosure, and their description is specific and detailed, but should not be understood as a limitation on the patent scope of the present disclosure. It should be noted that, for a person of ordinary skill in the art may further make variations and improvements without departing from the conception of the present disclosure, and these all fall within the protection scope of the present disclosure. Therefore, the protection scope of the present disclosure should be subject to the appended claims.

What is claimed is:

1. An image display luminance compensation method, applied to a processing device, the method comprising:

controlling a photographing device to capture a grayscale image, and obtaining luminance data of the captured grayscale image;

determining a target dimming interval in which a display grayscale of the grayscale image is located from a plurality of dimming intervals of a display screen, and determining an index value of the display grayscale in the target dimming interval;

determining whether a luminance compensation is performed on the grayscale image according to the index value;

obtaining set compensation data of a plurality of grayscale binding points when the processing device determines that the luminance compensation is performed on the grayscale image; and performing the luminance compensation on the luminance data of the grayscale image according to the set compensation data of the plurality of grayscale binding points.

2. The image display luminance compensation method according to claim 1, wherein the determining whether the luminance compensation is performed on the grayscale image according to the index value comprises:

obtaining a luminance compensation protection threshold of the target dimming interval;

determining, when the index value is greater than or equal to the luminance compensation protection threshold, that the luminance compensation is performed on the grayscale image; and determining, when the index value is less than the luminance compensation protection threshold, that the luminance compensation is not performed on the grayscale image.

3. The image display luminance compensation method according to claim 1, further comprising:

determining whether the display grayscale is located in a target grayscale range in a set grayscale interval; and performing, if the processing device determines that the display grayscale is located in the target grayscale range in the set grayscale interval, an interval compression processing on the display grayscale according to a maximum interval value and a minimum interval value of the grayscale interval to obtain an adjusted grayscale;

wherein the target grayscale range comprises a first grayscale range and a second grayscale range, the first grayscale range is a grayscale range less than a first grayscale value, the second grayscale range is a grayscale range greater than a second grayscale value, and the first grayscale value is less than the second grayscale value.

4. The image display luminance compensation method according to claim 1, wherein the performing the luminance compensation on the luminance data of the grayscale image according to the set compensation data of the plurality of grayscale binding points comprises:

comparing the display grayscale with a grayscale corresponding to a maximum binding point and a grayscale corresponding to a minimum binding point among the plurality of grayscale binding points, respectively, to obtain a comparison result;

determining target compensation data of the display grayscale according to the comparison result and the set compensation data of the plurality of grayscale binding points; and performing the luminance compensation on the luminance data of the grayscale image by using the target compensation data.

5. The image display luminance compensation method according to claim 4, wherein the determining the target compensation data of the display grayscale according to the comparison result and the set compensation data of the plurality of grayscale binding points comprises:

determining, when the comparison result indicates that the display grayscale is greater than the grayscale corresponding to the minimum binding point and less than the grayscale corresponding to the maximum binding point, the target compensation data of the display grayscale by performing an interpolation processing on the set compensation data of the plurality of grayscale binding points.

6. The image display luminance compensation method according to claim 4, wherein the determining the target compensation data of the display grayscale according to the comparison result and the set compensation data of the plurality of grayscale binding points comprises:

generating, when the comparison result indicates that the display grayscale is less than the grayscale corresponding to the minimum binding point, set compensation data corresponding to a grayscale of a first endpoint according to an endpoint adjustment coefficient and the set compensation data corresponding to the minimum binding point; and performing an interpolation processing on the set compensation data corresponding to the minimum binding point and the set compensation data corresponding to the grayscale of the first endpoint to obtain the target compensation data of the display grayscale.

7. The image display luminance compensation method according to claim 4, wherein the determining the target compensation data of the display grayscale according to the comparison result and the set compensation data of the plurality of grayscale binding points comprises:

generating, when the comparison result indicates that the display grayscale is greater than the grayscale corresponding to the maximum binding point, set compensation data corresponding to a grayscale of a second endpoint according to an endpoint adjustment coefficient and the set compensation data corresponding to the maximum binding point; and performing an interpolation processing on the set compensation data corresponding to the maximum binding point and the set compensation data corresponding to the second endpoint to obtain the target compensation data of the display grayscale.

8. The image display luminance compensation method according to claim 4, wherein the determining the target compensation data of the display grayscale according to the comparison result and the set compensation data of the plurality of grayscale binding points comprises:

determining, when the comparison result indicates that the display grayscale is equal to the grayscale corresponding to the minimum binding point, the set compensation data of the minimum binding point as the target compensation data; and determining, when the comparison result indicates that the display grayscale is equal to the grayscale corresponding to the maximum binding point, the set compensation data of the maximum binding point as the target compensation data.

9. The image display luminance compensation method according to claim 1, wherein the determining the index value of the display grayscale in the target dimming interval comprises:

determining a grayscale binding point corresponding to the display grayscale in the target dimming interval; and determining an index value corresponding to the grayscale binding point as the index value of the display grayscale in the target dimming interval.

10. The image display luminance compensation method according to claim 1, wherein the obtaining the set compensation data of the plurality of grayscale binding points comprises:

obtaining luminance data of a plurality of set grayscale images captured under a target shooting luminance;

determining set compensation data corresponding to a plurality of display grayscales according to the luminance data of the plurality of set grayscale images; and determining the plurality of grayscale binding points from the plurality of display grayscales, and obtaining the set compensation data of the plurality of grayscale binding points.

11. The image display luminance compensation method according to claim 10, wherein the determining the set compensation data corresponding to the plurality of display grayscales comprises:

solving a preset grayscale-luminance relationship curve function according to the luminance data of the plurality of set grayscale images to determine relationship parameters in the grayscale-luminance relationship curve;

generating a grayscale difference function according to the relationship parameters in the grayscale luminance relationship curve; and inputting standard luminance data of the plurality of display grayscales and the luminance data of the plurality of set grayscale images into the grayscale difference function to solve and obtain the set compensation data corresponding to the plurality of display grayscales.

12. A non-transitory computer-readable storage medium having a computer program stored therein, wherein the computer program, when executed by a processor, causes the processor to perform the image display luminance compensation method according to claim 1.

13. A computer device comprising a memory and a processor, wherein the memory stores a computer program, and the processor, when executing the computer program, performs an image display luminance compensation method, comprising:

obtaining luminance data of a captured grayscale image;

determining a target dimming interval in which a display grayscale of the grayscale image is located from a plurality of dimming intervals of a display screen, and determining an index value of the display grayscale in the target dimming interval;

determining whether a luminance compensation is performed on the grayscale image according to the index value;

obtaining set compensation data of a plurality of grayscale binding points when the processor determines that the luminance compensation is performed on the grayscale image; and performing the luminance compensation on the luminance data of the grayscale image according to the set compensation data of the plurality of grayscale binding points.

14. The computer device according to claim 13, wherein the determining whether the luminance compensation is performed on the grayscale image according to the index value comprises:

obtaining a luminance compensation protection threshold of the target dimming interval;

determining, when the index value is greater than or equal to the luminance compensation protection threshold, that the luminance compensation is performed on the grayscale image; and determining, when the index value is less than the luminance compensation protection threshold, that the luminance compensation is not performed on the grayscale image.

15. The computer device according to claim 13, further comprising:

determining whether the display grayscale is located in a target grayscale range in a set grayscale interval; and performing, if the processor determines that the display grayscale is located in the target grayscale range in the set grayscale interval, an interval compression processing on the display grayscale according to a maximum interval value and a minimum interval value of the grayscale interval to obtain an adjusted grayscale;

wherein the target grayscale range comprises a first grayscale range and a second grayscale range, the first grayscale range is a grayscale range less than a first grayscale value, the second grayscale range is a grayscale range greater than a second grayscale value, and the first grayscale value is less than the second grayscale value.

16. The computer device according to claim 13, wherein the performing the luminance compensation on the luminance data of the grayscale image according to the set compensation data of the plurality of grayscale binding points comprises:

comparing the display grayscale with a grayscale corresponding to a maximum binding point and a grayscale corresponding to a minimum binding point among the plurality of grayscale binding points, respectively, to obtain a comparison result;

determining target compensation data of the display grayscale according to the comparison result and the set compensation data of the plurality of grayscale binding points; and performing the luminance compensation on the luminance data of the grayscale image by using the target compensation data.

17. The computer device according to claim 16, wherein the determining the target compensation data of the display grayscale according to the comparison result and the set compensation data of the plurality of grayscale binding points comprises:

determining, when the comparison result indicates that the display grayscale is greater than the grayscale corresponding to the minimum binding point and less than the grayscale corresponding to the maximum binding point, the target compensation data of the display grayscale by performing an interpolation processing on the set compensation data of the plurality of grayscale binding points.

18. The computer device according to claim 16, wherein the determining the target compensation data of the display grayscale according to the comparison result and the set compensation data of the plurality of grayscale binding points comprises:

generating, when the comparison result indicates that the display grayscale is less than the grayscale corresponding to the minimum binding point, set compensation data corresponding to a grayscale of a first endpoint according to an endpoint adjustment coefficient and the set compensation data corresponding to the minimum binding point; and performing an interpolation processing on the set compensation data corresponding to the minimum binding point and the set compensation data corresponding to the grayscale of the first endpoint to obtain the target compensation data of the display grayscale.

19. The computer device according to claim 16, wherein the determining the target compensation data of the display grayscale according to the comparison result and the set compensation data of the plurality of grayscale binding points comprises:

generating, when the comparison result indicates that the display grayscale is greater than the grayscale corresponding to the maximum binding point, set compensation data corresponding to a grayscale of a second endpoint according to an endpoint adjustment coefficient and the set compensation data corresponding to the maximum binding point; and performing an interpolation processing on the set compensation data corresponding to the maximum binding point and the set compensation data corresponding to the second endpoint to obtain the target compensation data of the display grayscale.

20. The computer device according to claim 16, wherein the determining the target compensation data of the display grayscale according to the comparison result and the set compensation data of the plurality of grayscale binding points comprises:

determining, when the comparison result indicates that the display grayscale is equal to the grayscale corresponding to the minimum binding point, the set compensation data of the minimum binding point as the target compensation data; and determining, when the comparison result indicates that the display grayscale is equal to the grayscale corresponding to the maximum binding point, the set compensation data of the maximum binding point as the target compensation data.

* * * * *